Sept. 1, 1964   R. E. BROWN ETAL   3,146,534
SPELLING DEVICES
Filed April 30, 1962   3 Sheets-Sheet 1

INVENTORS
RAYMOND E. BROWN & THOMAS A. CRUGNALE
BY
Joseph A. Fenlon
ATTORNEY

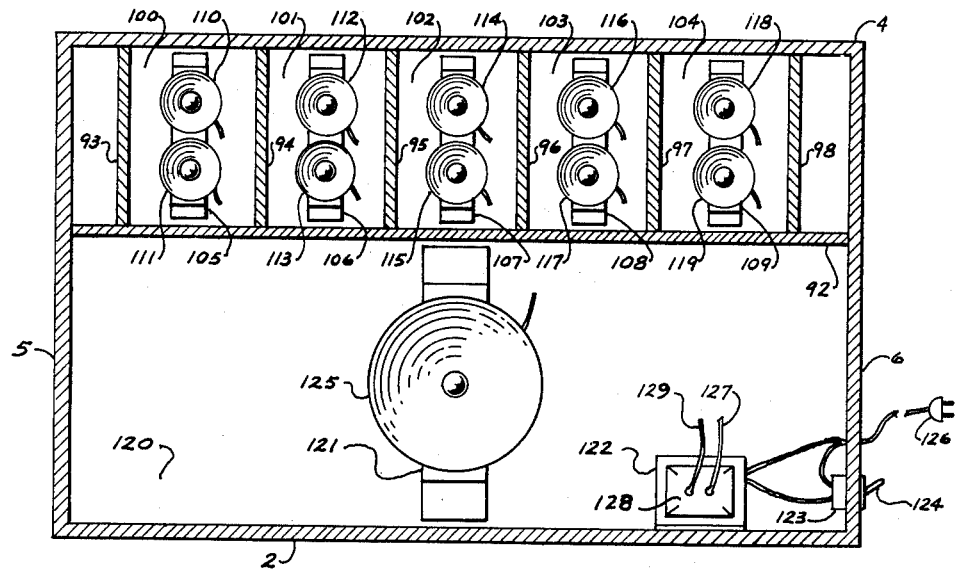
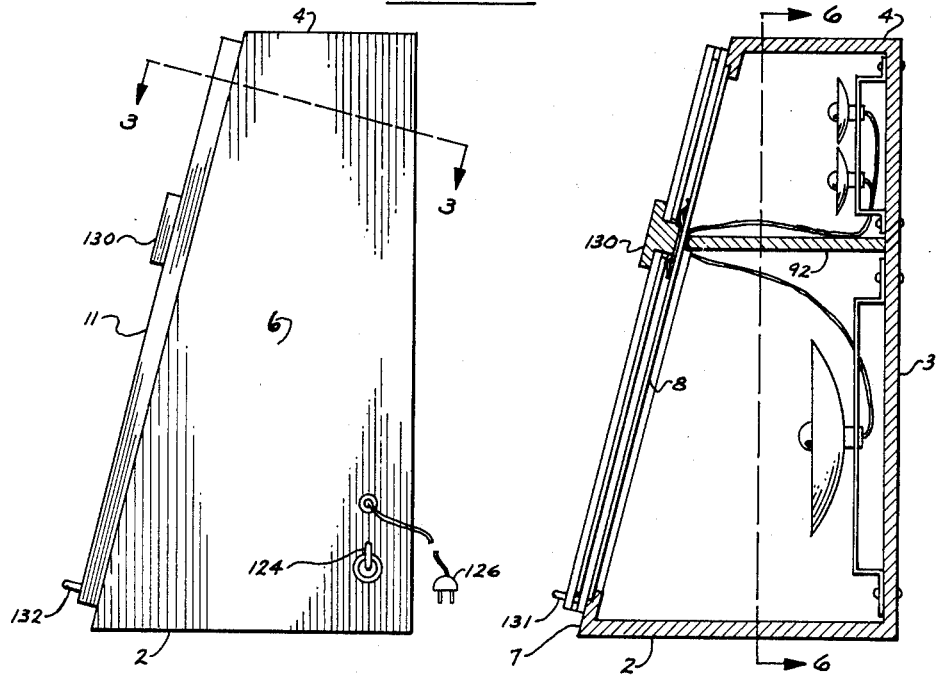

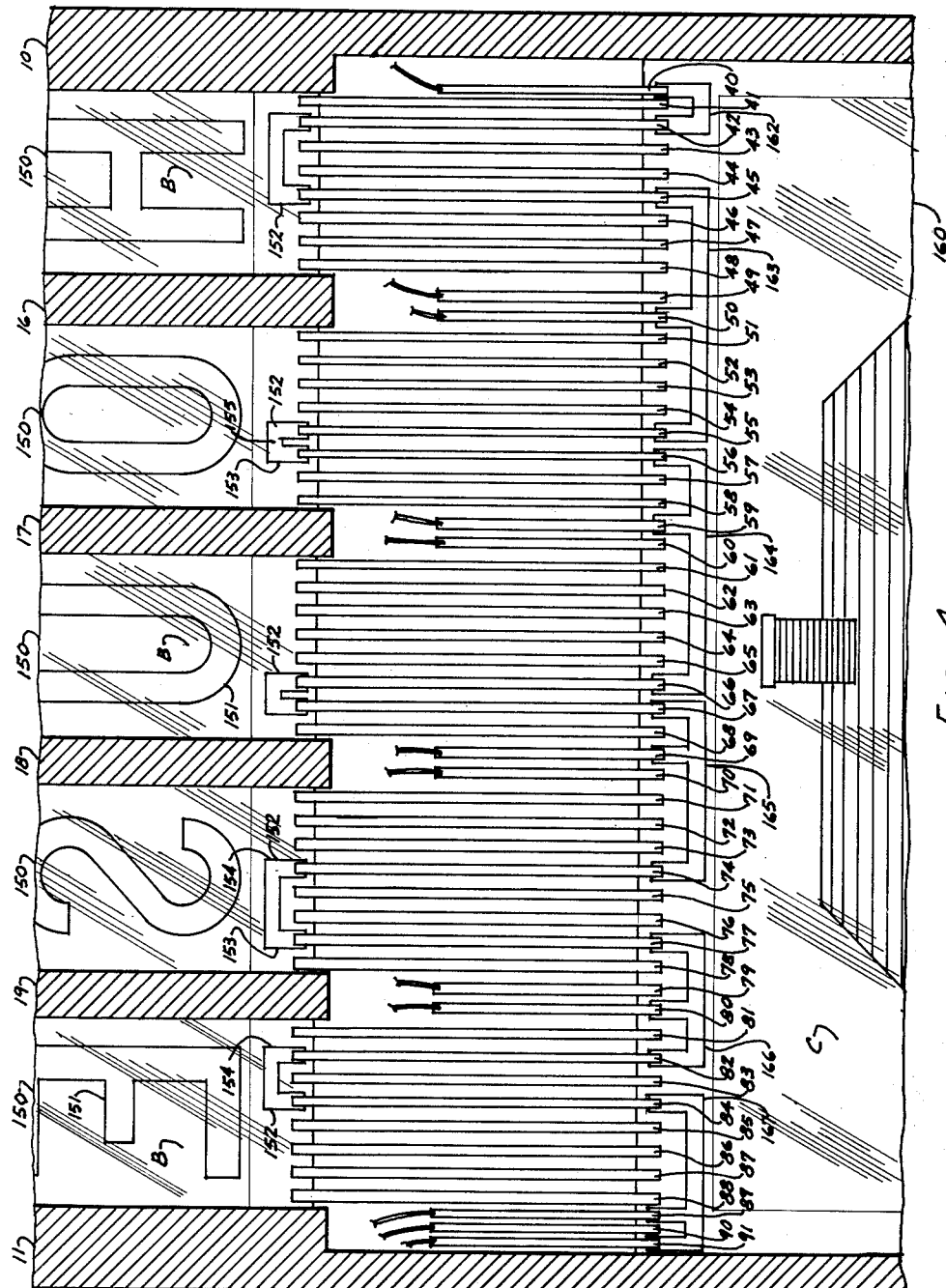

United States Patent Office 3,146,534
Patented Sept. 1, 1964

3,146,534
SPELLING DEVICES
Raymond E. Brown, 765 Hazelvalley, Hazelwood, Mo., and Thomas A. Crugnale, 9201 Gedde, Woodson Terrace, Mo.
Filed Apr. 30, 1962, Ser. No. 190,993
8 Claims. (Cl. 35—35)

This invention relates to spelling devices for use in classrooms and the like and in particular to devices with which children are required to arrange lettered cards in a line to spell out words defined by preselected picture cards.

It is the primary object of the present invention to provide a spelling device which provides for the matching of a picture with a word to be spelled out on a letter by letter basis.

It is also an object of the present invention to provide the spelling device of the type described in which the correctness of each particular letter selected may be readily indicated as the speller progresses through the word.

It is a further object of the present invention to provide a device of the type described, which distinguishes between vowels and consonants.

With the above and other objects in view, which will become apparent on reading the following description, our invention resides in the novel features of form, construction, arrangement and combination of parts presently described and pointed out in the claims.

In the accompanying drawings:

FIGURE 2 is a side elevational view thereof;

FIGURE 4 is an enlarged fragmentary sectional view taken along lines 4—4 of FIGURE 3;

FIGURE 5 is a sectional view taken along lines 5—5 of FIGURE 3;

FIGURE 6 is a sectional view taken along lines 6—6 of FIGURE 5;

Figure 1:
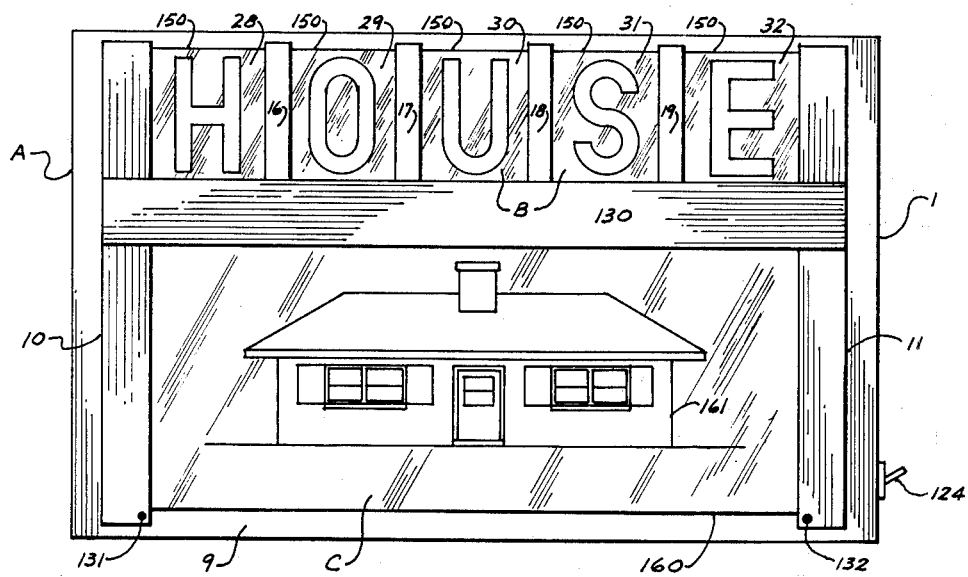
FIGURE 1 is a front elevational view of an educational device embodying the present invention.
Figure 3:
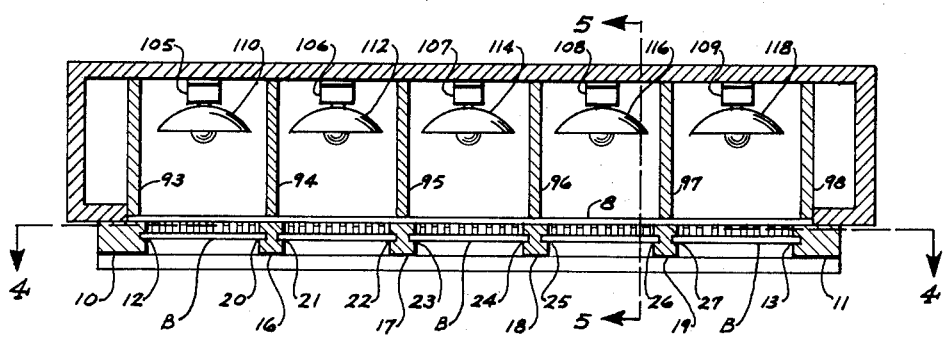
FIGURE 3 is a sectional view taken along lines 3—3 of FIGURE 2.
Figure 7:
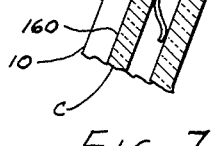
FIGURE 7 is an enlarged fragmentary sectional view showing the manner of establishing electrical contact between the separated cards.
Figure 8:
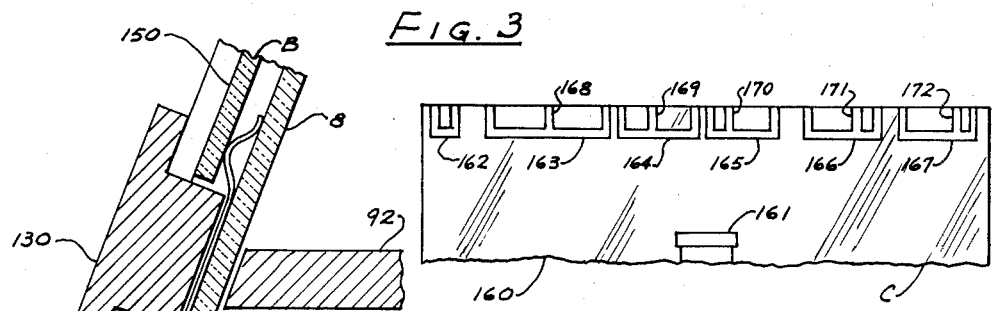
FIGURE 8 is a fragmentary view of the upper margin of the object card including the jumper straps.

Referring now in more detail and by reference character to the drawings, which illustrate a preferred embodiment of the present invention, A designates a spelling device comprising a housing 1 including a base 2, a back 3, a top 4, opposing sides 5, 6, and an inclined face 7. The inclined face 7 includes a large centrally located sheet 8 of translucent non-conductive material and a border 9 of opaque material.

Secured to the sheet 8 along opposing lateral margins thereof, is a pair of complementary members 10, 11, each respectively provided with elongated lateral grooves 12, 13. Intermediate the ends of the members 10, 11, the grooves 12, 13, are blocked, and secured to the sheet 8 between the upper portions of the members 10, 11, are four divider strips, 16, 17, 18, 19, each respectively provided on opposing sides thereof with elongated grooves 20, 21, 22, 23, 24, 25, 26, and 27. The grooves 20 through 27 inclusive, each extend substantially along almost the entire length of their respective divider strips and are each terminated adjacent the respective lower margins thereof, for purposes presently more fully to appear. The divider strips 16, 17, 18, 19, are evenly spaced one from the other and from the members 10, 11, whereby to divide the upper portion of the sheet 8 into 5 equally spaced translucent upper windows, 28, 29, 30, 31, and 32.

Riveted or otherwise rigidly secured to the sheet 8 between the member 10 and the divider strip 16 beneath the window 28 are eight equally spaced, parallel, substantially identical jumper straps 41, 42, 43, 44, 45, 46, 47, 48. Similarly riveted or otherwise rigidly secured to the sheet 8 below the window 29 between the divider strips 16, 17, are eight evenly spaced, parallel, substantially identical jumper straps 51, 52, 53, 54, 55, 56, 57, 58. Also rigidly secured to the sheet 8, between the divider strips 17, 18, below the window 30, are eight evenly spaced, parallel, substantially identical jumper straps 61, 62, 63, 64, 65, 66, 67, and 68; rigidly secured to the sheet 8 between the divider strips 18, 19, below the window 31 are eight evenly spaced, parallel, substantially identical jumper straps 71, 72, 73, 74, 75, 76, 77, and 78. Similarly rigidly secured to the sheet 8 between the divider strip 19 and the member 11 below the window 32 are eight evenly spaced, parallel, substantially identical jumper straps 81, 82, 83, 84, 85, 86, 87, 88, and all for purposes more fully to appear. Secured to the sheet 8 between the jumper strap 41 and the member 10 is a jumper strap 40; secured to the sheet 8 between the jumper strap 48 and the jumper strap 51 is a pair of jumper straps 49, 50; secured to the sheet 8 between the jumper straps 58 and 61, is a pair of jumper straps 59, 60; secured to the sheet 8 between the jumper straps 68, 71, is a pair of jumper straps 69, 70; secured to the sheet 8 between the jumper straps 78 and 81 is a pair of jumper straps 79, 80; and secured to the sheet 8 between the jumper strap 88 and the member 11 are three jumper straps 89, 90, and 91. The straps 40, 49, 50, 59, 60, 69, 70, 79, 80, 89, 90, and 91, are all substantially shorter in length than the remaining jumper straps, to prevent interference with the upper ends of said straps with the divider strips 16, 17, 18, and 19. It should be here noted that the straps numbered 40 through 91 inclusive are all parallel and aligned between the members 10, 11, and further have all of their lower ends in substantial alignment one with the other. It should be further noted that the jumper straps numbered 41 through 48 inclusive project upwardly between the divider strip 16 and the member 10; that the jumper straps numbered 51 through 58 inclusive project upwardly between the divider strips 16, 17; that the jumper straps numbered 61 through 68 inclusive project upwardly between the divider strips 17, 18; that the jumper straps numbered 71 through 78 inclusive project upwardly between the divider strips 18, 19; and that the jumper straps numbered 81 through 88 inclusive project upwardly between the divider strip 19 and the member 11.

The housing 1 is integrally provided with a horizontal shelf 92 and six divider panels 93, 94, 95, 96, 97, and 98, which are located between the shelf 92 and the top 4 of the housing 1 whereby to define five substantially equal sized compartments 100, 101, 102, 103, and 104. Secured to the housing 1 within the compartments 100, 101, 102, 103, 104, respectively, are brackets 105, 106, 107, 108, and 109, on which respectively are mounted conventional lamps 110 and 111, 112 and 113, 114 and 115, 116 and 117, and 118 and 119, respectively, the lamps 110, 112, 114, 116, and 118 being conventionally provided with means for projecting a beam of red light toward the windows 28, 29, 30, 31, and 32, respectively, and the lamps 111, 113, 115, 117, and 119, being conventionally provided with means for projecting a beam of white light toward the windows 28, 29, 30, 31, and 32, respectively, all for purposes presently more fully to appear. The shelf 92 also combines with the sides 5 and 6 of the base 2 to define an enlarged compartment 120, in which is conventionally mounted a bracket 121, a step-down transformer 122, and an electrical switch 123 provided with toggle handle 124 which projects through the side 6. Conventionally mounted on the bracket 121 is a substantially larger lamp 125 adapted for projecting a beam upwardly toward the lower portion of the transparent sheet 8. The primary winding of the step-down transformer 122 is connected in series to the switch 124 and to a plug 126 adapted for insertion in a conventional wall outlet (not shown) whereby upon insertion of the plug 126 into the wall outlet and manipulation of the handle 124, electrical current will be supplied to the primary winding of the transformer 122 for purposes presently more fully to appear. One side of the filaments of the lamps 110 through 119 inclusive and the lamp 125 are connected in common to one end 127 of the secondary winding 128 of the transformer 122. The other end 129 of the secondary winding 128 of the transformer 122 is electrically connected to the jumper strap 40. The other side of the filaments of the lamps 110, 112, 114, 116, and 118 are respectively connected to the jumper straps 49, 59, 69, 79, and 89; the other side of the filaments of the lamps 111, 113, 115, 117, and 119, are respectively electrically connected to the jumper straps 50, 60, 70, 80, and 90; and the other side of the filament of the lamp 125 is connected to the jumper strap 91, all for purposes presently more fully to appear.

Secured to the members 10, 11, and the divider strips 16, 17, 18, 19, above the jumper straps 40 through 91 inclusive is a cover panel 130. Removably mounted in the members 10, 11, near the lower ends thereof, respectively, are pins 131, 132, the said pins being conventionally adapted for removable insertion in the members 10, 11, respectively, whereby to block the grooves 12, 13, respectively at the lower ends thereof.

Provided for sliding insertion between the grooves 12 and 20, 21 and 22, 23 and 24, 25 and 26, and 27 and 13, is a plurality of letter cards B comprising a sheet 150 of translucent non-conductive material on which is mounted an opaque letter symbol 151. It should be here noted that the letter symbols differ one from the other but since they are all identical in principle of operation, they will be described as if they were merely one for purposes of simplifying this disclosure. Mounted on the under side of the sheet 150 along the lower margin thereof is a jumper strip 152 comprising a pair of spaced, parallel legs 153, 154, interconnected by a bight 155, the jumper strip 152 being composed of conductive material which is bonded or otherwise suitably secured to the sheet 150 whereby to cause a current path through the leg 153, the bight 155, and the leg 154, all for purposes presently more fully to appear. The strips 152 are constructed to co-act with the straps 41 through 48, the straps 51 through 58, 61 through 68, 71 through 78, and 81 through 88, in a manner such that a completed electrical circuit will exist between the straps ending with the same numerical digit when the letter card B is inserted in the respective grooves above the upper windows 28, 29, 30, 31, and 32. Referring now to Table I, which said table appears at the end of the specification, a suitable letter coding is presented for which all of the letters in the alphabet may be covered by the eight jumper straps presently located beneath each of the five upper windows, 28 through 32 inclusive. The numerals presented in Table I refer to the last digit of the particular jumper strap referred to in the drawings. For example, if the letter E were inserted between the member 10 and the divider strip 16 in the upper window 28, Table I indicates that jumper strap 42 would become electrically connected to jumper straps 44; similarly, if the letter E were inserted between the divider strip 19 and the member 11, Table A indicates that the jumper strap 82 would be electrically connected to the jumper strap 84, all for purposes presently more fully to appear.

Provided for insertion between the members 10 and 11 below the cover panel 130 is a picture card C comprising an enlarged sheet 160 of translucent non-conductive material on which is presented an opaque picture symbol 161. Bonded to the underside of the letter card C is a plurality of conductors including a first jumper 162, a second jumper 163, a third jumper 164, a fourth jumper 165, a fifth jumper 166, and a sixth jumper 167, The jumpers 162 through 167 inclusive are arranged to co-act with the letter cards B, to provide a continuous circuit between the opposing ends 127, 129 of the secondary winding 128 of the transformer 122 through the jumper strips 40–91 inclusive when the letter cards are properly arranged above the upper windows 28 through 32 inclusive.

In the example depicted wherein a symbol of a house D is presented on the object card C, the jumpers 162 through 167 inclusive are arranged to provide a continuous circuit from strip 40 to strip 91 through the strips 41 through 90 inclusive when the letter cards B on which the letter symbols H, O, U, S, E are incorporated are respectively inserted above the windows 28, 29, 30, 31, and 32.

With the letter card B containing the symbol H inserted between the grooves 12, 20, above the window 28, strip 42 will be electrically connected to strip 45; with the letter card B containing the symbol O inserted between the grooves 21, 22, above the window 29, strip 55 will be electrically connected to strip 56; with the letter card B containing the symbol U inserted between the grooves 23, 24, above the window 30, strip 66 will be electrically connected to strip 67; with the letter card B containing the symbol S inserted between the grooves 25, 26, above the window 31, strip 74 will be electrically connected to strip 77; and with the letter card B containing the symbol E inserted between the grooves 27, 13, above the window 32, strip 82 will be electrically connected to strip 84, all for purposes presently more fully to appear.

Thus it should be readily apparent that the jumper 162 is located on the card C such that when the card C is inserted between the grooves 12, 13, and held against the members 10, 11, therein by pins 131, 132, inserted at the lower extremities of the members 11, 12, respectively, the strip 40 and the one end of the secondary winding of the transformer 122 connected thereto will be electrically connected to the strip 42; similarly, the jumper 163 is adapted for establishing electrical contact between the strip 45 and the strip 55 when the card C is properly contained between the members 11, 12; in like manner, the jumpers 164, 165, 166, and 167, are adapted for establishing electrical contact between the strips 56 and 66, 67 and 74, 77 and 82, and 84 and 91, respectively when the card C is properly contained between the members 11 and 12.

The jumpers 163, 164, 165, 166, and 167, also integrally include intermediate contacts 168, 169, 170, 171, and 172, respectively which are respectively adapted for establishing electrical contact to one of the strips 49 or 50, 59 or 60, 69 or 70, 79 or 80, and 89 or 90, respectively, depending on whether the letter card B which completes the electrical circuit to that particular jumper depicts a vowel or a consonant, respectively. Thus for the letter H, a consonant, above the window 28, the contact 168 establishes electrical continuity between the pumper 163 and the strip 50; for the letter O, a vowel, above the window 29, the contact 169 establishes electrical continuity between the jumper 164 and the strip 59; for the letter U, a vowel, above the window 30, the contact 170 establishes electrical continuity between the jumper 165 and the strip 69; and for the letters S and E, a consonant and a vowel, respectively, above the windows 31 and 32 respectively, electrical continuity will be respectively established between the jumper 166 and the strip 80 by the contact 171, and the jumper 167 and the strip 89 by the contact 172, all for purposes presently more fully to appear.

In operation, the device A is placed on a table T and the object card C is slid between the members 10 and 11 and secured in such position in the grooves 12 and 13 by the pins 131, 132. Thereafter the various letter cards B are placed beside the housing 1 on the table T in face up position and the plug 126 is inserted in an electrical outlet (not shown). The instructor then turns on the power by manipulation of the toggle handle 124 of the switch 123 whereupon the device A is placed into operative condition.

Continuing with our preselected example of the word and picture HOUSE, which was chosen for purposes of illustration and not limitation, it may be observed that with the device A in the operative condition, through the jumper 162 the strip 42 is brought to the same electrical potential as the end 129 of the secondary winding 128. The student is then requested to select the first letter of the word defined by the object card C and insert that letter card B in the gooves 12, 20, above the window 28. If a letter card B containing the letter H is selected and inserted, electrical continuity will be established between the jumpers 162 and 163, and the jumper 163 will be brought to the same electrical potential as the end 129 of the secondary winding 128, and will complete a first electrical circuit through the contact 168, the strip 50, and the filament of the lamp 111 to the end 127 of the secondary winding 128, causing the lamp 111 to project a beam of white light through sheet 8 and the card inserted in the upper window 28. The glowing white light will inform the student the first letter has been correctly selected and is a consonant.

The student will then be instructed to proceed with the selection of the second letter. All letter cards except those containing the jumper strap 152 coded for the letter O according to Table I will fail to cause the jumper 164 to assume the electrical potential of the end 129 of the winding 128. Selection of the letter card B containing the letter O and insertion thereof between the divider strips 16 and 17 will transfer the electrical potential of the end 129 of the winding 128 to the jumper 164 and cause the lamp 112 to project a beam of red light through the window 29 and the letter card B thereabove, whereby to indicate the correct letter has been selected and it is a vowel. Similarly, correct selection of the letter card B bearing the letter U and insertion thereof above the window 30 will cause the lamp 114 to project a beam of red light through said window and letter card; correct selection of the letter card B bearing the letter S and insertion thereof above the window 31 will cause the lamp 117 to project a beam of white light through said window and letter card; and correct selection of the letter card B bearing the letter E and insertion thereof above the window 32 will cause the lamp 118 to project a beam of red light through said window and letter card. It should of course be apparent that the letter cards B must be inserted in order for the device to function properly.

When all cards have been properly inserted, the strip 91 will also be placed at the electrical potential of the end 129 of the winding 128 and an electrical circuit will be established through the lamp 125 causing a beam of light to illuminate the object card C. Lighting of the object card C will visually advise the student that the spelling of the word has been completed, particularly where three letter words and four letter words are defined by the object cards.

Where words of less than five letters are defined by the object cards C, it is merely necessary to extend the jumper of the last letter over to come into contact with the strip 91 and to eliminate any subsequent jumpers on the object card. Although the description has been shown as a five letter word and object presentation, this invention may be adapted to words of any length.

In addition, it should be noted that the table I was presented for purposes of illustration and not of limitation and any similar type of coding may be used where at least two separate strips are used for different letters of the alphabet.

It should be also understood that although our invention was described for spelling devices, it is also readily adaptable to mathematical, geographical and other similar problems using techniques presently known in the art. For example, the object card could depict five different addition problems, the answers to which would be inserted in the various upper windows to make the windows become illuminated as each problem was individually solved. Or the object card could contain the map shape of a country, state, or city, and the student required to spell out the name thereof.

It should be further understood that changes and modifications in the form, combination, construction and arrangement of the various parts of our invention may be made and substituted for those herein described without departing from the nature and principle of our invention.

*Table I*

| Card bearing letter— | connects strap ending with numeral— | strap ending to with numeral— |
|---|---|---|
| A | 1 | 2 |
| B | 1 | 3 |
| C | 2 | 3 |
| D | 1 | 4 |
| E | 2 | 4 |
| F | 3 | 4 |
| G | 1 | 5 |
| H | 2 | 5 |
| I | 3 | 5 |
| J | 4 | 5 |
| K | 1 | 6 |
| L | 2 | 6 |
| M | 3 | 6 |
| N | 4 | 6 |
| O | 5 | 6 |
| P | 1 | 7 |
| Q | 2 | 7 |
| R | 3 | 7 |
| S | 4 | 7 |
| T | 5 | 7 |
| U | 6 | 7 |
| V | 1 | 8 |
| W | 2 | 8 |
| X | 3 | 8 |
| Y | 4 | 8 |
| Z | 5 | 8 |

Having thus described our invention, what we claim and desire to secure by Letters Patent is stated and pointed out in the following claims:

1. An educational device comprising a housing, a first card provided with a representation of a preselected subject, means for mounting the first card on the housing, a plurality of second cards provided with different letter symbols, means for mounting the second cards on the housing in aligned relation, first self-operating means for illuminating the first card when a first card is mounted on the housing and a predetermined group of second cards are mounted on the housing in predetermined order, said predetermined order being such as to cause the first card to become illuminated when the letter symbols of the second cards correctly spell out the word represented by the subject representation of the first card and second self-operating means for illuminating each letter card in sequence as said letter card is properly mounted on the housing in correspondence with said first card, said second self-operating means including means for illuminating each correctly mounted second card with light of one color if the letter symbol thereon is a consonant and light of a second color if the letter symbol is a vowel.

2. An educational device comprising a housing, a plurality of electrically conductive jumper strips mounted on said housing in electrical isolation one from the other, means for establishing a difference in electrical potential between two of said jumper strips, a first card including a representation of a preselected object and at least one pre-arranged jumper, first means for removably securing said first card to said housing and simultaneously establishing electrical continuity between said jumper and at least two of said jumper strips, a second card including a representation of preselected symbol and a pre-arranged jumper strap, second means for removably mounting said letter card on said housing and simultaneously establishing electrical contact between at least two of said jumper strips, said jumper, jumper strips, and jumper straps all being so located and arranged as to complete an electrical circuit between the two aforementioned jumper strips across which the difference in electrical potential was established when the first and second cards are mounted in the first and second means.

3. An educational device comprising a housing, a plurality of electrically conductive jumper strips mounted on said housing in electrical isolation one from the other, means for establishing a difference in electrical potential between two of said jumper strips, a first card including a representation of a preselected object and at least one pre-arranged jumper, first means for removably securing said first card to said housing and simultaneously establishing electrical continuity between said jumper and at least two of said jumper strips, a plurality of second cards each depicting one letter of the alphabet and each provided with a pre-arranged jumper strap, the pre-arranged of said jumper straps differing for differing letters depicted on the respective second cards, second means for removably mounting at least two of said second cards on said housing in aligned relation one to the other and simultaneously establishing electrical contact between at least two of the jumper strips and the jumper straps on each second card, said first card and second cards being so constructed and adapted that when the first card is properly mounted in the first means and the second cards are properly mounted on the second means in predetermined order, said jumper and the respective jumper straps will coact with the jumper strips to complete an electrical circuit between the two aforementioned jumper strips across which the difference in electrical potential was first established.

4. An educational device comprising a housing, a plurality of electrically conductive jumper strips mounted in substantially parallel relation on said housing in electrical isolation one from the other, means for establishing a difference in electrical potential between two of said jumper strips, a first card including a representation of a preselected object and a plurality of pre-arranged jumpers, first means for removably securing said first card to said housing and simultaneously establishing electrical continuity between each of said jumpers and at least two of said jumper strips, a plurality of second cards each depicting a preselected symbol and each provided with a pre-arranged jumper strap, the pre-arrangement of said jumper straps differing for different symbols depicted on the respective second cards, second means for removably mounting at least two of said second cards on said housing in aligned relation one to the other and simultaneously establishing electrical contact between at least two of the jumper strips and the jumper straps on each second card, said first card and second cards being so constructed and adapted that when the first card is properly mounted in the first means and the second cards are properly monuted on the second means in predetermined order, said jumpers and the respective jumper straps will coact with the jumper strips to complete an electrical circuit between the two aforementioned jumper strips across which the difference in electrical potential was first established.

5. An educational device comprising a housing, a plurality of electrically conductive jumper strips mounted in substantially parallel equally-spaced relation on said housing in electrical isolation one from the other, means for establishing a difference in electrical potential between two of said jumper strips, a first card including a representation of a preselected object and a first jumper and a second jumper, first means for removably securing said first card to said housing and simultaneously establishing electrical contact between two of said jumper strips and said first jumper and also between two other jumper strips and said second jumper, a plurality of second cards each depicting one letter of the alphabet and each provided with a pre-arranged jumper strap, the pre-arrangement of said jumper straps differing for differing letters depicted on the respective second cards, second means for removably mounting at least two of said second cards on said housing in aligned relation one to the other and simultaneously establishing electrical contact between at least two of the jumper strips and the jumper straps on each second card, said first card and second cards being so constructed and adapted that when the first card is properly mounted in the first means and the second cards are properly mounted on the second means in predetermined order, said first and second jumpers and the respective jumper straps will coact with the jumper strips to complete an electrical circuit between the two aforementioned jumper strips across which the difference in electrical potential was first established.

6. An educational device comprising a housing including an enlarged non-conductive translucent sheet, a plurality of spaced electrically conductive strips mounted in alignment with and parallel to each other on said sheet, a pair of spaced complementary members mounted on said housing on opposing sides of said aligned strips, a first translucent non-conductive card including a representation of a preselected object and a plurality of pre-arranged jumpers along one margin thereof, means for removably securing the object card between the spaced members outwardly of said sheet and overlapping one of the ends of each of the aligned strips with each jumper in contact with at least two of said strips, at least one divider mounted on the sheet between the members adjacent the other ends of said strips whereby to define a plurality of windows in said sheet on the said other side of said strips, a plurality of second translucent cards each containing a letter symbol of a letter from the alphabet and a jumper strap, the jumper strap on all second cards which bear the same symbol being identical in size and location on the second card with the jumper straps on all other second cards bearing the same letter symbol and differing in size and location from the jumper straps on all other second cards which bear different letter symbols, means for snugly seating the second cards above the windows with the jumper straps on each second card therein seated being in contact with at least two of the said strips, the jumper straps and jumpers being prearranged and prelocated so that when the first card is secured between the spaced members and the second cards are seated above the windows in such manner that the letter symbols on the said second cards spell out correctly the word defined by the object representation on the first card a continuous electrical circuit will be established between the jumper straps, strips, and jumpers, and means for causing a lamp to illuminate the object card when a continuous electrical circuit is established between the jumper straps, strips, and jumpers.

7. The educational device of claim 6 including means for illuminating each second card in sequence as the letter symbols are correctly matched with the mounted first card.

8. The educational device of claim 6 including means for illuminating each second card in sequence as the letter symbols are correctly matched with the mounted first card, said illuminating means including a first lighting means for illuminating the second card with light of one color if the letter symbol is a consonant and second lighting means for illuminating said second card with light of a second color if said letter symbol is a vowel.

References Cited in the file of this patent

UNITED STATES PATENTS

| | | |
|---|---|---|
| 2,424,169 | Hoffman | July 15, 1947 |
| 2,612,708 | Amsel | Oct. 7, 1952 |
| 2,624,127 | Okahara | Jan. 6, 1953 |
| 2,853,799 | Magnussen et al. | Sept. 30, 1958 |
| 2,900,741 | McIver | Aug. 25, 1959 |
| 3,015,895 | Stall | Jan. 9, 1962 |